United States Patent
Ramirez, Jr.

(10) Patent No.: US 10,190,810 B2
(45) Date of Patent: Jan. 29, 2019

(54) MINIATURIZED MOTOR ASSEMBLY

(71) Applicant: Molon Motor and Coil Corporation, Arlington Heights, IL (US)

(72) Inventor: Emilio A. Ramirez, Jr., Roselle, IL (US)

(73) Assignee: MOLON MOTOR & COIL CORPORATION, Arlington Heights, IL (US)

( * ) Notice: Subject to any disclaimer, the term of this patent is extended or adjusted under 35 U.S.C. 154(b) by 477 days.

(21) Appl. No.: 14/724,444

(22) Filed: May 28, 2015

(65) Prior Publication Data

US 2015/0345851 A1    Dec. 3, 2015

Related U.S. Application Data (60) Provisional application No. 62/003,609, filed on May 28, 2014.

(51) Int. Cl.
| | |
|---|---|
| *F25C 1/10* | (2006.01) |
| *H02K 7/116* | (2006.01) |
| *F25C 5/04* | (2006.01) |
| *H02K 11/33* | (2016.01) |

(52) U.S. Cl.
CPC .................. *F25C 1/10* (2013.01); *F25C 5/04* (2013.01); *H02K 7/116* (2013.01); *H02K 11/33* (2016.01); *F25C 2305/022* (2013.01)

(58) Field of Classification Search
CPC ...... F25C 1/10; F25C 2305/022; F25C 1/045; F25C 2400/14; F25C 2600/04
See application file for complete search history.

(56) References Cited

U.S. PATENT DOCUMENTS

| | | |
|---|---|---|
| 3,243,917 A | 4/1966 | Giammarino et al. |
| 3,486,271 A | 12/1969 | Feikema |
| 3,716,110 A | 2/1973 | Fonda |
| 3,747,265 A | 7/1973 | Gagnon |
| 3,772,825 A | 11/1973 | Gagnon |
| 3,810,515 A | 5/1974 | Ingro |
| 3,964,206 A | 6/1976 | Bernhard |

(Continued)

FOREIGN PATENT DOCUMENTS

| | | |
|---|---|---|
| EP | 0551113 A2 | 7/1993 |
| EP | 0681359 A1 | 11/1995 |

(Continued)

OTHER PUBLICATIONS

"Electric Motors Reference Issue," Machine Design, Apr. 9, 1970, pp. 45-49, vol. 42, No. 9, Benjamin L. Hummel, Cleveland, Ohio.

*Primary Examiner* — Filip Zec
(74) *Attorney, Agent, or Firm* — Oliff PLC; R. Brian Drozd (57) ABSTRACT

A compact, miniaturized motor assembly for use in an ice making and harvesting device in an appliance is provided. The miniaturized motor assembly includes a gear train assembly having an output shaft engaged with an ice receiving and storage component. A DC motor powers the gear train assembly, which rotates the output shaft in a plurality of directions to effectively loosen and release ice from an ice making device while offering less stress on the ice making device. A method for releasing ice from an ice making device and completing an ice harvesting cycle using the miniaturized motor assembly is also provided.

20 Claims, 11 Drawing Sheets

(56) References Cited

U.S. PATENT DOCUMENTS

| | | | |
|---|---|---|---|
| 3,980,937 | A | 9/1976 | Bostrom et al. |
| 4,471,705 | A | 9/1984 | Takenoya et al. |
| 4,565,538 | A | 1/1986 | Kennedy et al. |
| 4,734,077 | A | 3/1988 | Taylor et al. |
| 4,754,830 | A | 7/1988 | Morishita et al. |
| 4,795,867 | A | 1/1989 | Ohi et al. |
| 4,810,014 | A | 3/1989 | McGourty et al. |
| 4,864,322 | A | 9/1989 | Yamamoto et al. |
| 4,877,926 | A | 10/1989 | Yamase |
| 4,878,877 | A | 11/1989 | Auer et al. |
| 5,004,077 | A | 4/1991 | Carlson et al. |
| 5,062,312 | A | 11/1991 | Watanuki et al. |
| 5,172,605 | A | 12/1992 | Schwartz |
| 5,256,921 | A | 10/1993 | Pruis et al. |
| 5,404,060 | A | 4/1995 | Nakahashi et al. |
| 5,446,326 | A | 8/1995 | Scheider |
| 5,652,418 | A * | 7/1997 | Amonett ............ H01H 43/10 200/38 B |
| 5,734,210 | A | 3/1998 | Keutz |
| 5,737,968 | A | 4/1998 | Hardey et al. |
| 5,747,903 | A | 5/1998 | Klingler |
| 5,768,900 | A * | 6/1998 | Lee, II ............ F25C 1/04 62/137 |
| 5,791,514 | A | 8/1998 | Kirk, III et al. |
| 5,839,320 | A | 11/1998 | Komachi |
| 5,875,681 | A | 3/1999 | Gerrand et al. |
| 5,937,507 | A | 8/1999 | Asakura et al. |
| 6,028,384 | A | 2/2000 | Billman et al. |
| 6,054,785 | A | 4/2000 | Kerdjoudj et al. |
| 6,118,553 | A | 9/2000 | Berg |
| 6,148,620 | A * | 11/2000 | Kumagai ............ F25C 1/04 62/135 |
| 6,465,915 | B1 | 10/2002 | Kerdjoudj et al. |
| 6,509,661 | B1 | 1/2003 | Kujira et al. |
| 6,617,726 | B1 | 9/2003 | Tsergas |
| 6,998,744 | B2 | 2/2006 | Tsergas |
| 7,017,364 | B2 * | 3/2006 | Lee ............ F25C 1/04 62/351 |
| 7,712,323 | B2 * | 5/2010 | Villani ............ F25C 1/045 62/135 |
| 8,201,478 | B2 | 6/2012 | Ramirez, Jr. et al. |
| 2003/0011330 | A1 | 1/2003 | Machalek et al. |
| 2007/0018517 | A1 | 1/2007 | Huck et al. |
| 2009/0121568 | A1 | 5/2009 | Acosta et al. |
| 2009/0211292 | A1 * | 8/2009 | Smith ............ F25C 5/187 62/344 |
| 2011/0259037 | A1 * | 10/2011 | McCollough ............ F25C 5/04 62/345 |
| 2013/0167575 | A1 * | 7/2013 | Hong ............ F25C 1/00 62/344 |

FOREIGN PATENT DOCUMENTS

| | | |
|---|---|---|
| EP | 1101919 A2 | 5/2001 |
| GB | 1433250 A | 4/1976 |
| JP | S56-065765 A | 6/1981 |
| JP | H02-190586 A | 7/1990 |
| JP | H03-16841 A | 1/1991 |
| JP | H05-086761 A | 4/1993 |
| JP | H05-252692 A | 9/1993 |
| JP | H08-193668 A | 7/1996 |
| JP | H08-216659 A | 8/1996 |
| JP | H09-310946 A | 12/1997 |
| JP | H10-248212 A | 9/1998 |
| WO | 9531657 A1 | 11/1995 |
| WO | 9918318 A1 | 4/1999 |

* cited by examiner

ND MOTOR ASSEMBLY

MINIATURIZED MOTOR ASSEMBLY

TECHNICAL FIELD

The present disclosure relates generally to a miniaturized motor assembly. In particular, the present disclosure relates to a miniaturized motor assembly for use in an ice making and harvesting device that is part of an appliance such as a refrigerator, freezer, commercial ice machine or vending machine. A method of harvesting ice from an ice making device using the miniaturized motor assembly is also provided.

BACKGROUND

Automatic ice making devices have been incorporated into the freezer section of household refrigerators for many years. Generally, because of the limited space in a typical freezer, there is an advantage to having a compact ice maker. Ice making device, generally larger than those in a household refrigerator, are also included in commercial ice making machines and soft drink vending/dispensing machines.

Ice makers also include an ice bin or an ice tray, generally made of metal or plastic, for receiving water and forming and storing ice cubes until ready for use. Additionally, ice making devices are mounted by known means within the refrigerator/freezer or vending machine. Ice making devices, whether household or commercial, also include an ice detecting component or sensors for indicating when the ice tray is full and ready for harvesting, and a drive unit for moving the ice tray between an ice making position and a harvesting position.

During ice harvest, rotation of the tray is required with enough force to loosen the ice within the tray, but without excessive torque that may damage the tray and shorten the life of the tray. Prior ice makers did not include a motor that would permit accurate control over the ice harvesting process, and specifically control the amount of torque and rotational direction applied to the ice tray.

Therefore, it would be advantageous to provide a miniaturized motor assembly having a compact arrangement within a gear box for use in the ice making section of a refrigerator, freezer or other ice making appliance for loosening and harvesting ice from an ice tray.

It would also be advantageous to provide a miniaturized motor assembly for use in the ice making section of a refrigerator, freezer or other ice making appliance for moving an ice tray between a storage position and a harvesting position.

It would further be advantageous to provide a miniaturized motor assembly for use in the ice making section of a refrigerator, freezer or other ice making appliance for loosening and harvesting the ice cubes from the ice tray with minimal force exerted on the tray.

It would also be advantageous to provide a miniaturized motor assembly for use in the ice making section of a refrigerator, freezer or other ice making appliance adapted for detecting ice levels and harvesting time.

It would further be advantageous to provide a miniaturized motor assembly having a gear train assembly capable of operating and moving an ice tray in multiple directions for proper ice harvest without stress on the ice tray components.

It would also be advantageous to provide a miniaturized motor assembly having a gear train assembly capable of operating an ice tray component through a plurality of stages to release ice from the ice tray component.

The present disclosure provides these and other advantages which will become readily apparent from the detailed description, which follows.

SUMMARY

The present invention relates to miniaturized motor assembly for use in an ice making and harvesting device in an appliance. The miniaturized motor assembly includes a gear train assembly. A method for releasing ice from an ice tray using the miniaturized motor assembly is also provided.

To this end, in an embodiment of the present invention, miniaturized motor assembly capable of multi-stage operation is described. The miniaturized motor assembly comprises a housing comprising a base having a front section and a back section, a reversible motor positioned within the base, the motor having an input shaft, a gear train assembly coupled to the input shaft of the motor, the gear train assembly having an output shaft coupled to an ice receiving tray, a control board connected to the motor, wherein the motor powers the gear train assembly thereby rotating the output shaft and ice receiving tray into a plurality of positions.

In an embodiment of the present invention, the gear train assembly rotates the output shaft and ice receiving tray into a plurality of positions comprising the following: a first operating stage comprising rotating the output shaft and ice tray in a first direction to a first degree of rotation, a second operating stage comprising rotating the motor output shaft and ice tray in the first direction to a second degree of rotation, a third operating stage comprising rotating the motor output shaft and ice tray in the first direction to a third degree of rotation; and, a fourth operating stage comprising rotating the motor output shaft and ice tray in the second direction to a fourth degree of rotation.

In another embodiment, a miniaturized motor for use within an ice making and harvesting device in an appliance, is described. The miniaturized motor comprises a compact housing comprising a base having a front section with a front cover and a back section with a back cover, the housing mounted within an interior space of the appliance, a motor positioned within the front section of the housing, the motor being operable in a plurality of directions, a gear train assembly comprising a plurality of interconnected gears, the gear train coupled to an input shaft of the motor and positioned within the front section of the housing, an output shaft coupled to the gear train assembly, the output shaft extending outward from the front cover and connected to an ice delivery tray, a control board positioned in the back section of the housing, the control board coupled to the motor, wherein the control board produces an operating voltage for moving the motor between a plurality of directions thereby rotating the gear train assembly, the output shaft and the ice tray through a plurality of rotational directions to release ice from the tray.

In yet another embodiment, a method of harvesting ice from an ice making device is described. The method comprises the steps of releasing ice from an ice making device of an appliance, the method comprising the steps of providing a miniaturized motor assembly within an ice making appliance, attaching an ice receiving and storage component to the miniaturized motor assembly, operating the miniaturized motor assembly to move the ice receiving and storage component in a plurality of rotational directions, and releasing ice from the ice receiving and storage component.

It is, therefore, an advantage and objective of the present disclosure to provide a compact miniaturized motor assembly for use in an ice making appliance having limited space.

Moreover it is an advantage and objective of the present disclosure to provide a miniaturized motor assembly having a gear train assembly capable of operating an ice tray component through a plurality of stages or directions to release ice from the ice tray component.

It is further and advantage and objective of the present disclosure to provide a miniaturized motor assembly and method for harvesting ice from an ice making device with efficient torque and less mechanical stress on the ice making device.

It is yet another advantage and objective of the present disclosure to provide a method of harvesting ice from an ice making device offering less torque and stress on the ice receiving and storage component, thereby extending the life of the component.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present invention relates to a miniaturized motor assembly for use within ice making and harvesting machine. The present miniaturized motor assembly includes a gear train assembly having an output shaft engaged with an ice receiving and storage component, or ice tray as known. A DC motor powers the gear train assembly, which rotates the output shaft in a plurality of directions to effectively loosen and release ice from an ice making device while offering less stress on the ice making device.

Figure 1:
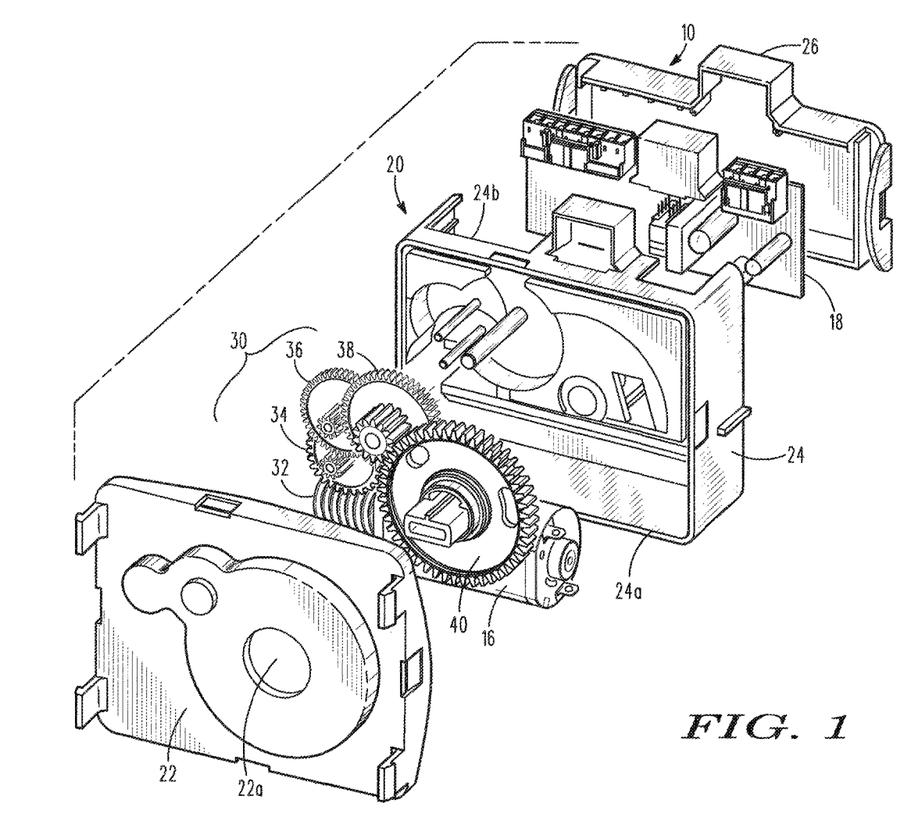
FIG. 1 illustrates an exploded view of a miniaturized motor assembly in accordance with the present disclosure.
Figure 2:
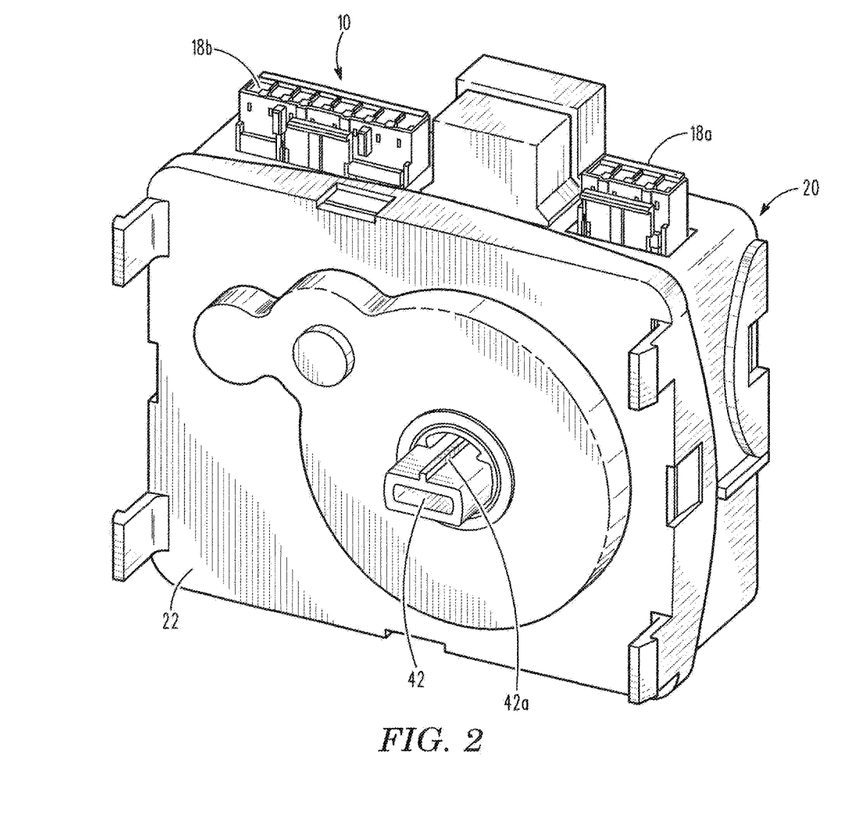
FIG. 2 is perspective view of the assembled miniaturized motor assembly of the present disclosure.

Now referring to the figures, wherein like numerals refer to like parts, FIGS. 1-5 illustrate an embodiment of a miniaturized motor assembly 10. FIG. 1 illustrates an exploded view of a miniaturized motor assembly 10, while FIG. 2 illustrates a front view assembled motor. The miniaturized motor assembly 10 generally comprises the following components: a housing 20, a reversible motor 16, a control board 18 and a gear train assembly 30. The miniaturized motor assembly 10 of the present disclosure would be attached to at least one ice receiving and storage component or ice tray (not shown) positioned within the refrigerator, vending machine, or other ice making appliance.

The housing 20 is designed to contain the motor 16, gear train assembly 30 and the control board 18, thereby creating a compact assembly useful in the limited space of an appliance. The housing 20 includes a front cover 22 having an opening 22a, a base 24 and a back cover 26. The base 24 includes two sections, a front section 24a and a back section 24b. The front section 24a of the base receives the gear train assembly 30 within the housing. The front cover 22 fits over the gear train assembly 30 and attaches to the base 24. The back section 24b receives the control board 18. The back cover 26 fits over the control board 18, and also attaches to the base 24. The front cover 22 and back cover 26 are secured to the base 24 using any suitable securing means including, screws, snap fit (FIG. 2) or ultrasonic welding. It should be understood that any suitable securing means can be used to connect the housing components, which will remain secure during use of the motor assembly.

Figure 3:
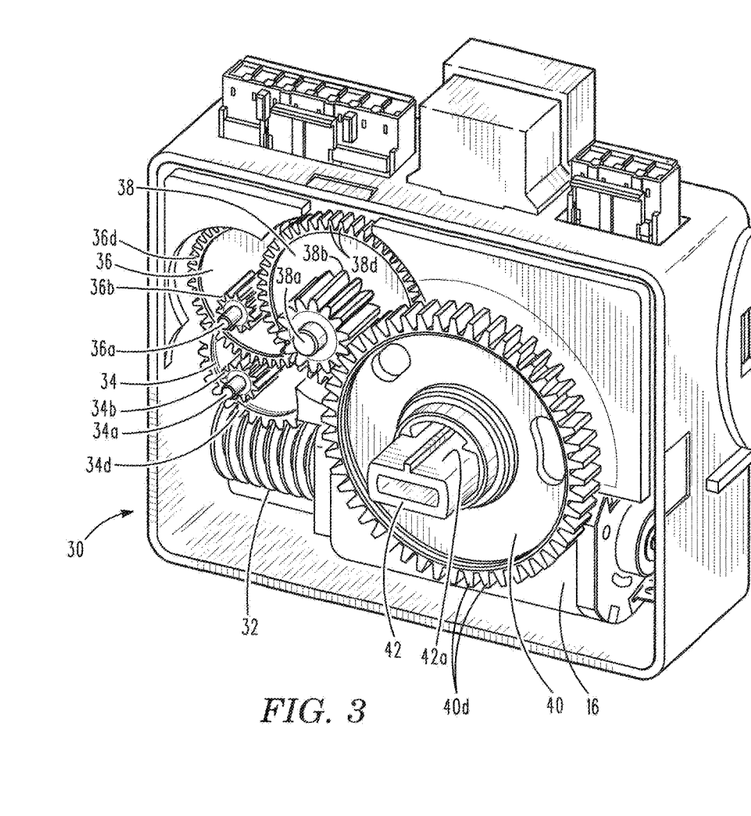
FIG. 3 is a perspective view of the gear train assembly of the present disclosure.

Referring to FIGS. 1 and 3, the miniature motor assembly 10 includes a reversible motor 16. The reversible motor 16 is positioned within the front section 24a of the base 24 of the housing 20. The motor 16 is generally a 24 volt DC motor or a 120 volt DC motor. The motor speed/torque is in the range of 2 to 4 rpm at approximately 10 lbs. of max load. The motor 16 includes an input or worm gear 32 extending from one end of the motor.

Figure 4:
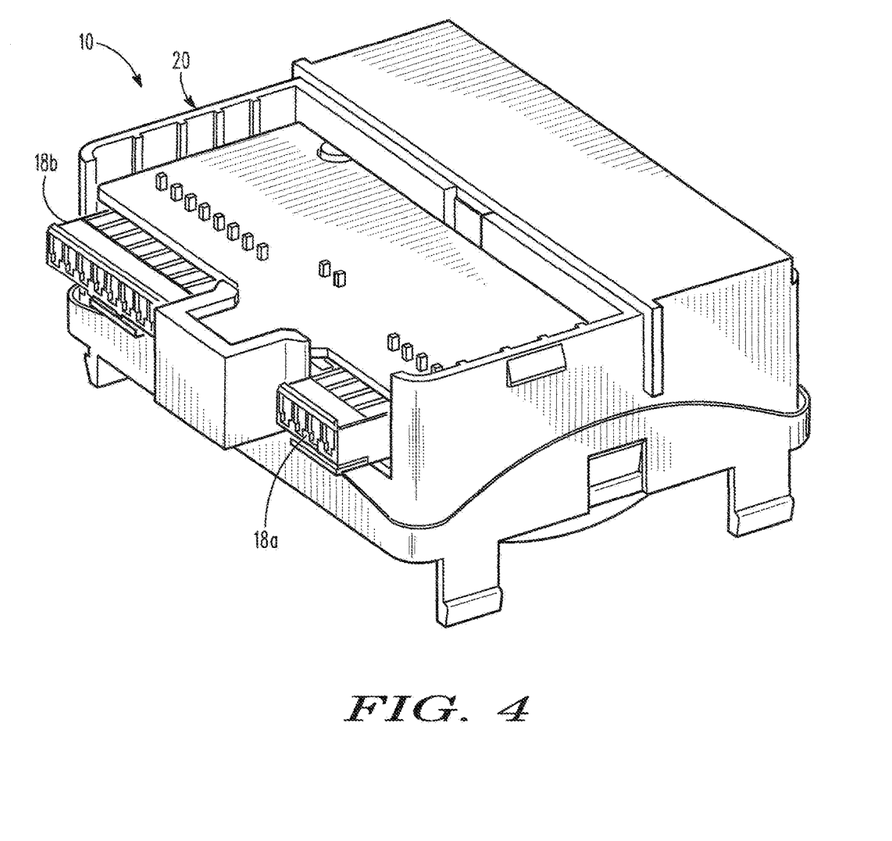
FIG. 4 is a perspective view of miniaturized motor assembly of the present disclosure, with a cover removed; and, FIG. 5 is a perspective view of the miniaturized motor assembly of the present disclosure.
Figure 5:
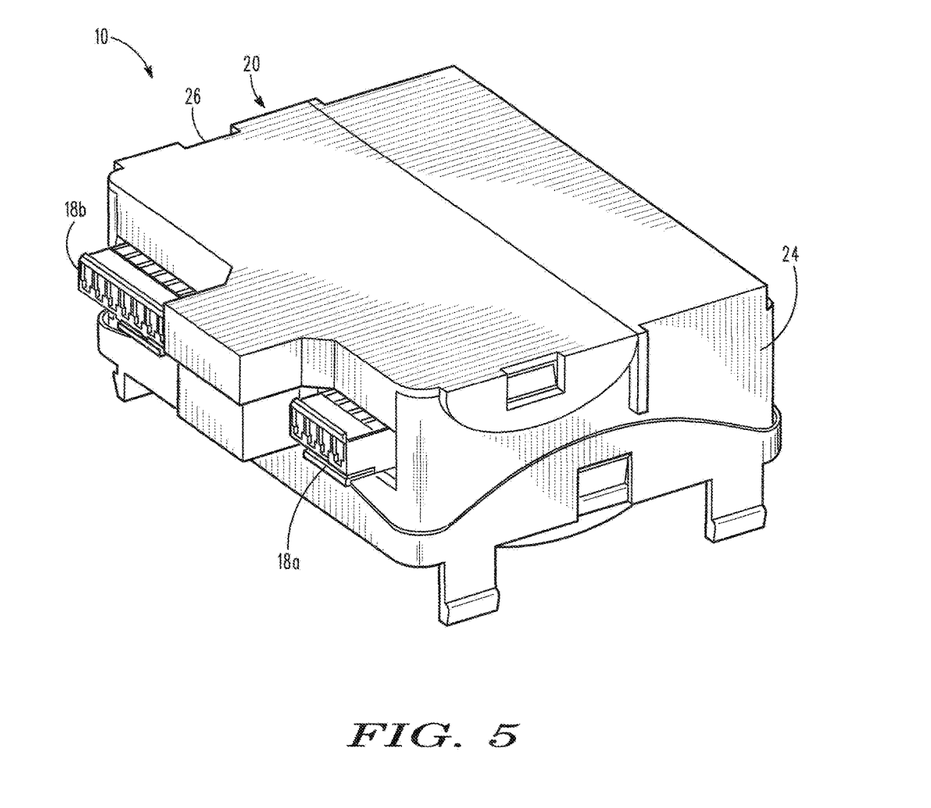
Figure 6A:
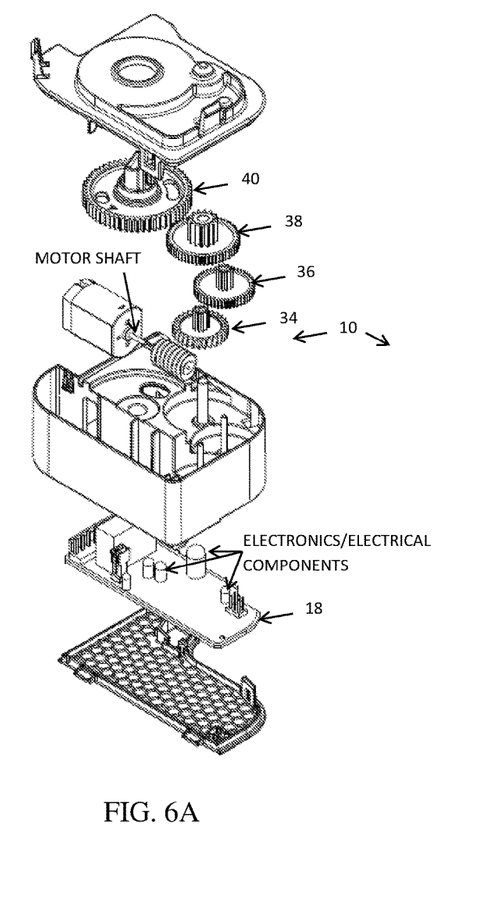
FIG. 6A and 6C show exploded views of FIG 6B according to an embodiment.
Figure 6B:
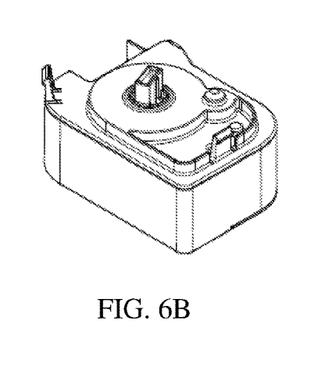
FIG. 6B illustrated an embodiment of an assembled miniaturized motor.
Figure 6C:
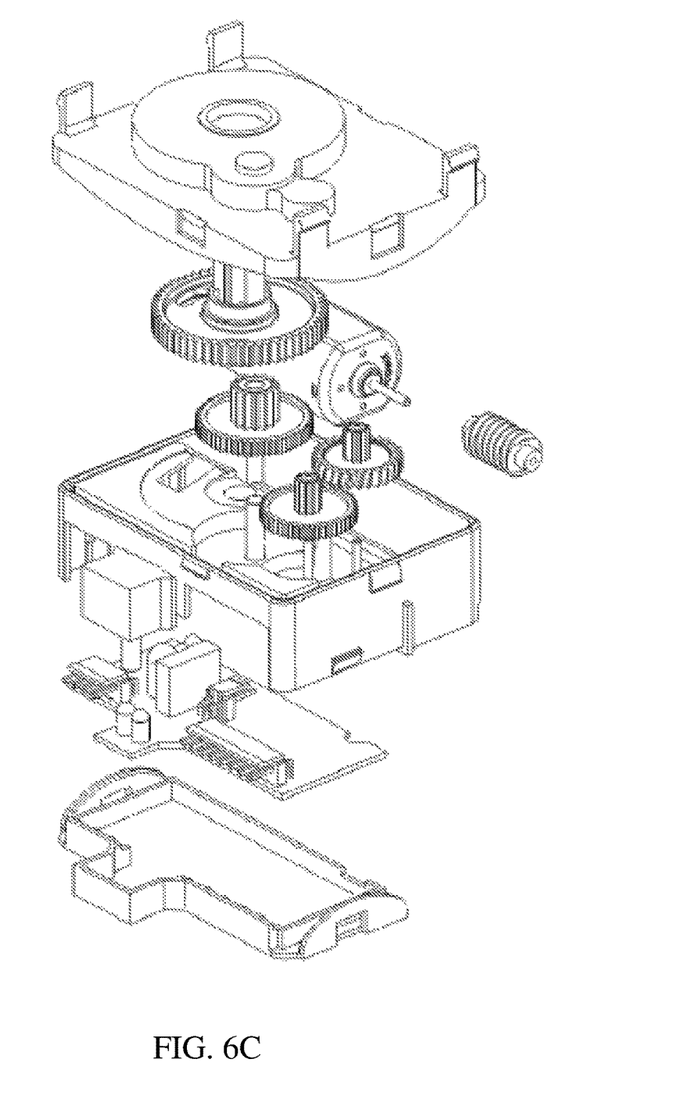
Figure 7A:
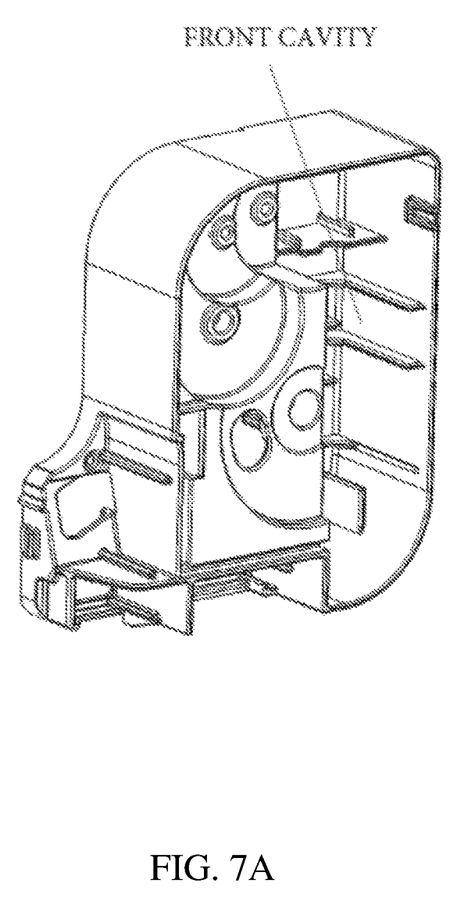
FIG. 7A shows a view of the front section of the housing which includes a front cavity according to an embodiment.
Figure 7B:
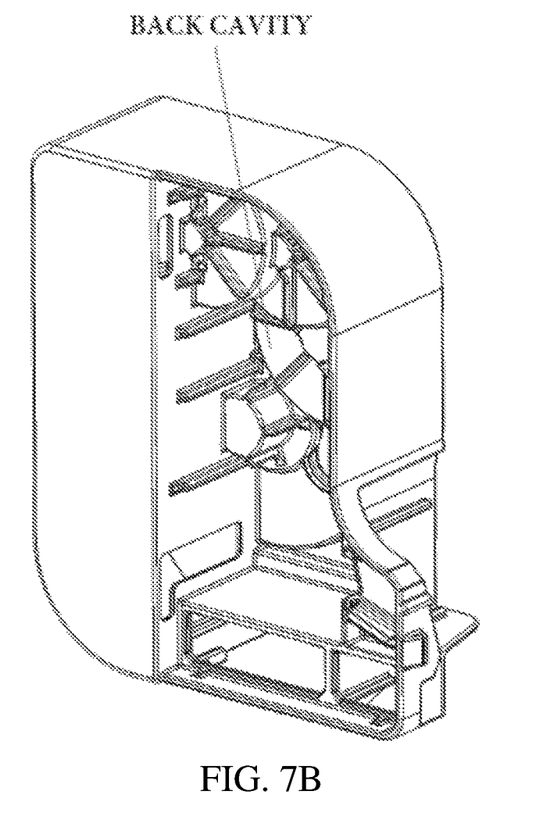
FIG. 7B shows a view of the back section of the housing which includes a back cavity according to an embodiment.
Figure 8:
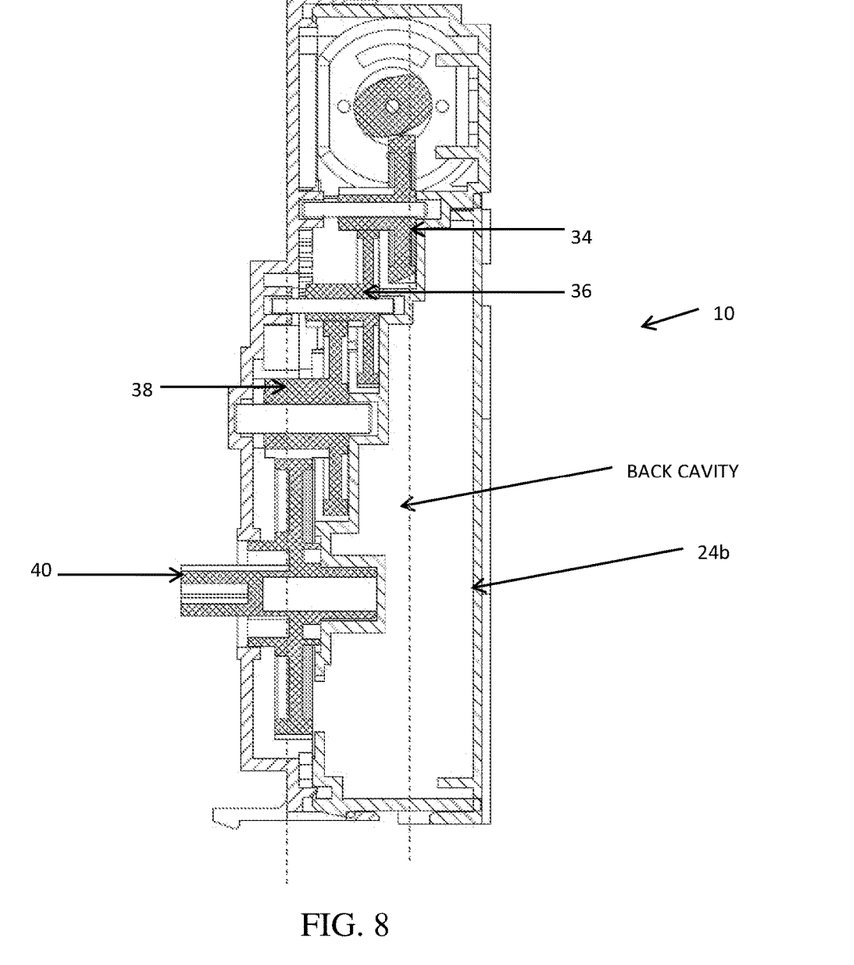
FIG. 8 shows a cross-sectional view of the motor of FIG. 6B and thus, illustrating the back cavity according to an embodiment.
Figure 9:
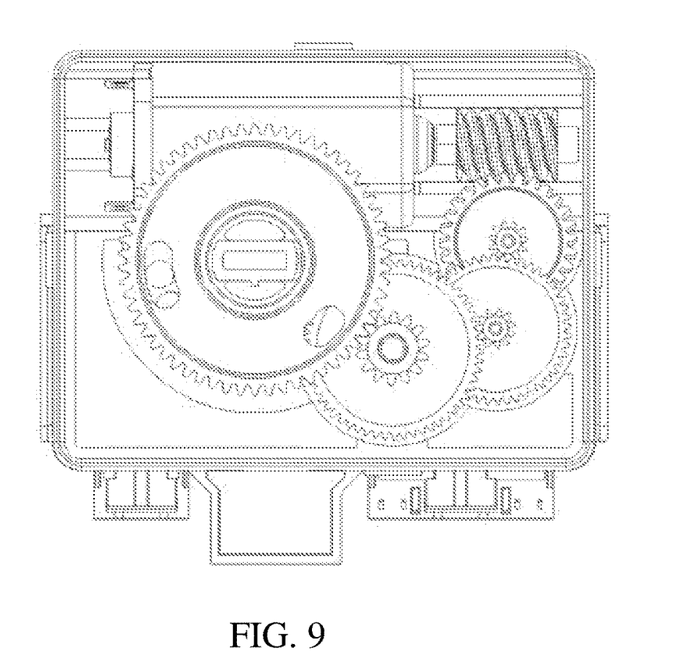
FIG. 9 and 10 show top and perspective, partially exposed views of FIG. 6B, respectively, according to an embodiment.
Figure 10:
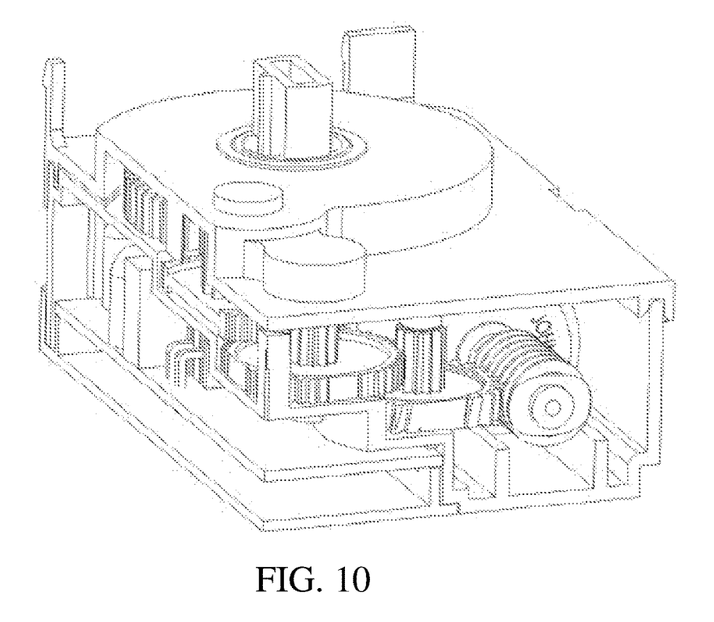

Mounted in the back section 24b of the housing 20 is a control board 18. The control board provides the power to the motor and other algorithms, which determine ice detection, when to harvest or release the ice from the trays, forward and reverse cycles, twisting cycles and other functions relative to proper ice harvesting detection. Referring to FIG. 2, the control board 18 generally includes an input signal connector 18a and an output signal connector 18b. FIG. 4 shows the back of the control board with the back cover 26 removed, while FIG. 5 shows the back cover in place on the back section 24b of the base 24.

As shown in FIG. 3, the worm gear 32 engages with a gear train assembly 32. The gear train assembly 30 includes a plurality of gears interconnected together. Specifically, the present gear motor includes a first stage gear 34, a second stage gear 36, a third stage gear 38, and a fourth stage or output gear 40. All of the gears have an outer toothed perimeter, 34d, 36d, 38d and 40d, respectively. The fourth stage output gear 40 includes an output shaft 42 in the center of the gear, which extends through an opening 22a in the front gearbox cover 22 of the housing 22 for engagement with at least one ice tray component (not shown). The gear train assembly 30 is secured to the base of the housing through gear pins, 34a, 36a and 38a, respectively. The first, second and third stage gears each include a toothed pinion 34b, 36b, 38b in the center of the respective gear.

During operation, and specifically during the ice harvest cycle of the appliance, the toothed perimeter of the gears 34, 36, 38 and 40 engages or meshes with the toothed pinion 34b, 36b, 38b of another respective gear thereby rotating the gear train assembly through a plurality of rotational stages. To achieve the rotational stages, the motor input worm gear 32 engages or meshes with and drives the first stage gear 34. The toothed pinion 34b of the first stage gear 34 engages with the toothed perimeter 36d of the second stage gear, thereby driving the second stage gear 36. The toothed pinion 36b of the second stage gear 36 engages with the toothed perimeter 38d and drives the third stage gear 38. The toothed pinion 38b of the third stage gear 38 engages with the toothed perimeter 40d of the fourth stage output gear 40, which activates the output shaft 42.

The output shaft 42 is connected to an ice tray component (not shown). The output shaft 42, which rotates in a forward and reverse rotational direction in response to the movements of the gear train assembly 30, rotates the ice tray component between a plurality of stages from ice storage to ice release. The output shaft 42 further includes a keying component 42a, which indicates the home or initial position orientation of the attached ice tray (FIG. 2). Typically, the home position of the tray is when the tray is in position for receiving liquid and forming ice cubes.

During the ice harvest cycle, and in order to release ice from the ice tray component, the gear train assembly 30 completes a series of rotational movements comprising a plurality of degrees of movement in different directions. The rotational movements create a twisting action on the ice tray component. For example, during the harvest cycle, through activation of the motor 16 and gear train assembly 30, the output shaft 42 of the output gear 40 will rotate the engaged ice tray from a home position in a first direction by about 170 degrees where it hits a stop (not shown). The output shaft 42 will then continue to rotate by about another 5 degrees of distance, providing an initial degree of torque or twist to the ice tray to initially loosen the ice cubes within the tray. At this stage, some of the ice cubes will be released from the tray into a receiving bin (not shown). The motor 16 will then continue to rotate the output shaft 42 by about 10 degrees, through the gear train assembly 30, to make the final twist and complete the ice harvesting process.

The output shaft 42 will then reverse in a second direction of rotation back to its home position, where the empty tray is ready for receiving water for new ice making. This series of movements results in a final degree of torque or twist applied to the ice tray to loosen and release the remaining cubes from the tray. Thus, the initial direction of rotation loosens the ice cubes from the tray and also reduces the amount of flex on the final twist, which dramatically increases the life of the tray by reducing the total amount of stress and torque applied to the generally plastic tray. Additionally, during the various stages of rotation, the ice tray may physically contact stop surfaces (not shown) on a frame (not shown), which is used to hold the miniature motor assembly 10 and ice tray within the appliance.

The miniature motor assembly 10 described above can be used in an ice making and harvesting device of an appliance. The appliance may be a residential or commercial refrigerator, a residential or commercial ice vending machine, or a soft drink dispensing or vending machine, just to name a few. Additionally, the housing and covers may be constructed from any suitable plastic, including acrylonitrile butadiene styrene (ABS) copolymers with or without reinforcement or other engineered plastics. Metals may also be used. Gears are made of nylon or other engineered plastics. Output shafts and other elements for transmitting torque can be fabricated out of either powered metal or metallic blanks.

A method for releasing ice from an ice making device is also provided. The method comprises providing a miniaturized motor assembly within an ice making device of an appliance, such as a residential or commercial refrigerator, or a soft drink vending machine. The method further includes providing a gear train motor assembly having an output shaft. At least one ice receiving and storage tray is coupled to the output shaft of the gear train assembly. A second end of the ice tray is pivotally mounted to a frame or bracket (not shown) within the appliance (not shown). Power is transmitted to the motor assembly as the control board (within the motor), through algorithms and other sensors within the control board determine the timing to harvest the ice from the ice tray. Signals are transmitted to the motor, which rotates the gear train assembly and the connected output shaft and attached ice tray, through a plurality of directions resulting in a complete harvest cycle.

The harvest cycle comprises the steps of performing an initial rotation of the ice tray through the output shaft from a home position to first rotational stage of about 170 degrees where it hits a stop (not shown). The output shaft 42 will then continue to rotate to a second rotational stage of about another 5 degrees of distance, providing an initial degree of torque or twist to the ice tray to initially loosen the ice cubes within the tray. At this stage, some of the ice cubes will be released from the tray into a receiving bin (not shown). The motor 16 will then continue to rotate the output shaft 42 to a third rotational stage of about another 10 degrees, through the gear train assembly 30, to make the final twist and complete the ice harvesting process. This series of movements results in a final degree of torque or twist applied to the ice tray to loosen and release the remaining cubes from the tray. The output shaft 42 will then reverse in a second direction to a fourth rotational stage rotating back to its home position, thus completing the entire harvest cycle. The motor 16 and gear train assembly 30 of the present method create enough torque and twist on the tray through the degrees of rotation and distance traveled by the ice tray, to loosen and release the ice cubes with minimal stress applied to the tray itself.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:
1. A miniaturized motor assembly comprising:
a motor comprising a rotatable shaft;
a gear train assembly coupled to the rotatable shaft of the motor and coupled to an output shaft, the gear train assembly comprising:
a series of cluster gears which directly connect with an output stage gear, the series of cluster gears comprising toothed perimeters and toothed pinions, where respective toothed pinions of the series of cluster gears engage with the respective toothed perimeters of the series of cluster gears, and wherein all of the toothed pinions are orientated in a common direction to allow for all of the series of cluster gears to be successively stacked upon one another, wherein the series of cluster gears are configured to be successively stacked upon one another so that the output stage gear is positioned in front of the motor in an axial direction of rotation of the output stage gear; and
a control board connected to the motor to control the motor to powers the gear train assembly, thereby rotating the output shaft into a plurality of positions.

2. The miniaturized motor assembly of claim 1, further comprising:
a housing comprising a front section and a back section, the housing enclosing the motor, gear train assembly and the control board,
wherein the gear train assembly comprises a first stage cluster gear, a second stage cluster gear, and a third stage cluster gear that directly connects to the output stage gear that has the output shaft,
wherein the motor, cluster gears and the output stage gear are each positioned within a cavity of the front section of the housing,
wherein the first stage cluster gear defines a first plane in a radial direction and the output stage gear defines a second plane in the radial direction, wherein at least some electronic components is disposed in an area between the first and second planes within a cavity of a back section of the housing.

3. The miniaturized motor assembly of claim 1,
wherein the rotatable shaft comprises an input worm gear, and
wherein the gear train assembly comprises the following:
a first stage cluster gear connected to and driven by the input worm gear;
a second stage cluster gear connected to and driven by the pinion of the first stage cluster gear;
a third stage cluster gear connected to and driven by the pinion of the second stage cluster gear; and,
the output stage gear connected to and driven by the pinion of the third stage cluster gear,
wherein the output stage gear rotates the output shaft, and
wherein the first stage cluster gear defines a first plane and the output stage gear defines a second plane, wherein at least part of the control board is disposed between the first and second planes within a cavity of a back section of the housing.

4. The miniaturized motor assembly of claim 1,
wherein motor which is configured to rotate the rotatable shaft in two opposing directions.

5. The miniaturized motor assembly of claim 1,
wherein the output stage gear has at least one opening to allow for an optical sensor to receive light through the opening.

6. The miniaturized motor assembly of claim 1,
wherein the control board is housed in the back section of a housing,
wherein the gear train assembly comprises the following:
a first stage cluster gear connected to and driven by the motor; and
the output stage gear,
wherein the output stage gear rotates the output shaft, and
wherein the first stage cluster gear defines a first plane and the output stage gear defines a second plane,
wherein the front section is defined by the area between the first and second planes, and
wherein the back section is defined by the first plane and a third plane corresponding to a back cover of the housing which is spaced away in an axial direction from the first plane and positioned to be furthest away from the second plane relative to the first plane.

7. The miniaturized motor assembly of claim 1,
wherein the toothed pinions of the series of gears and the output shaft form a shape of the letter "J,", wherein the "J" shape is defined such that, at a view looking towards the series of cluster gears in an axial direction of gear rotation, a line connecting a center of each gear is curved, thereby reducing a width of the motor assembly as opposed to the series of cluster gears all being aligned in a straight line.

8. The miniaturized motor assembly of claim 1,
wherein the miniaturized motor assembly is completely solid state.

9. The miniaturized motor assembly of claim 1,
wherein the output shaft is connected to an ice tray of an icemaker in order to rotate the ice tray in two different directions when rotated.

10. A miniaturized motor assembly comprising:
a motor comprising a rotatable shaft;
a gear train assembly coupled to the rotatable shaft of the motor and comprising an output shaft, the gear train assembly comprising:
a series of cluster gears that are successively stacked upon one another so respective gears are positioned in a first axial direction in front of a previous gear which that the respective gear engages, wherein a first stage cluster gear of the series of cluster gears defines a first plane in a radial direction and an output stage gear of the series of cluster gears defines a second plane in the radial direction, wherein at least some electronic components is disposed in an area between the first and second planes within a cavity of a back section of a housing of the gears; and
a control board connected to the motor to control the motor that powers the gear train assembly, thereby rotating the output shaft into a plurality of positions.

11. The miniaturized motor assembly of claim 10,
wherein the control board is configured to rotate the rotatable shaft rotate in two opposing directions.

12. The miniaturized motor assembly of claim 10,
wherein the toothed pinions of the series of cluster gears and the output shaft form a shape of the letter "J".

13. The miniaturized motor assembly of claim 10,
wherein the miniaturized motor assembly is completely solid state.

14. The miniaturized motor assembly of claim 10, further comprising:
a gearbox housing comprising a front section and a back section, a front cavity of the housing enclosing the motor, the gear train assembly and a back cavity of the housing enclosing electronics of a printed circuit board, the area being in the front section, and
wherein the motor and the output stage gear are each positioned within the front section.

15. The miniaturized motor assembly of claim 10,
wherein each toothed pinion in the series of gears are all orientated in a common axial direction.

16. The miniaturized motor assembly of claim 10,
wherein the rotatable shaft comprises an input worm gear, and
wherein the gear train assembly comprises the following:
a first stage gear cluster connected to and driven by the input worm gear;
a second stage gear cluster connected to and driven by the pinion of first stage gear cluster;
a third stage gear cluster connected to and driven by the pinion of the second stage gear cluster; and,
the output stage gear connected to and driven by the pinion of the third stage gear cluster, wherein the output stage gear rotates the output shaft, and
wherein the first stage cluster gear defines a first plane and the output stage gear defines a second plane, wherein at least part of the control board is disposed between the first and second planes.

17. The miniaturized motor assembly of claim 10, wherein the output stage gear overlaps with the motor in an axial direction of rotation of the output stage gear.

18. The miniaturized motor assembly of claim 10, wherein the output stage gear has at least one opening to allow for an optical sensor to receive light through the opening.

19. The miniaturized motor assembly of claim 14, wherein the control board is housed within a cavity of the back section of the housing,
wherein the front section is defined by the area between the first and second planes, and
wherein the back section is defined by the first plane and a third plane corresponding to a back cover of the housing which is spaced away from the first plane and positioned to be furthest away from the second plane relative to the first plane.

20. A motor assembly comprising:
a motor comprising a rotatable shaft;
a gear train assembly coupled to the rotatable shaft of the motor and comprising an output shaft, the gear train assembly comprising:
   a plurality of gears that are rotatably connected to each other and each gear is arranged at an angle relative to each other so that, at a view looking towards the plurality of gears in an axial direction of gear rotation, a line connecting a center of each gear is curved, thereby reducing a width of the motor assembly as opposed to the plurality of gears all being aligned in a straight line, wherein an output stage gear that includes the output shaft is positioned in front of the motor in the axial direction of rotation, thereby reducing a height of the motor assembly as opposed to the output stage gear not being positioned in front of the motor; and
a control board connected to the motor to control the motor to power the gear train assembly, thereby rotating the output shaft into a plurality of positions.

* * * * *